United States Patent [19]
Baylor et al.

[11] Patent Number: 5,822,763
[45] Date of Patent: Oct. 13, 1998

[54] CACHE COHERENCE PROTOCOL FOR REDUCING THE EFFECTS OF FALSE SHARING IN NON-BUS-BASED SHARED-MEMORY MULTIPROCESSORS

[75] Inventors: Sandra Johnson Baylor, Ossining; Yarsun Hsu, Pleasantville, both of N.Y.

[73] Assignee: IBM Corporation, Armonk, N.Y.

[21] Appl. No.: 635,071

[22] Filed: Apr. 19, 1996

[51] Int. Cl.⁶ .............................. G06F 12/00; G06F 13/00
[52] U.S. Cl. .............................. 711/141; 711/3; 711/118; 711/124; 711/154
[58] Field of Search ..................................... 395/448, 446, 395/449, 450, 451, 468; 711/119, 121, 122, 123, 124, 141, 154, 118

[56] References Cited

U.S. PATENT DOCUMENTS

| | | | |
|---|---|---|---|
| 4,905,141 | 2/1990 | Brenza ..................................... | 395/456 |
| 4,910,656 | 3/1990 | Scales, III et al. ...................... | 711/144 |
| 4,959,777 | 9/1990 | Holman, Jr. ............................. | 395/468 |
| 5,058,006 | 10/1991 | Durdan et al. .......................... | 395/449 |
| 5,155,824 | 10/1992 | Edenfield et al. ...................... | 711/143 |
| 5,313,609 | 5/1994 | Baylor et al. ........................... | 395/448 |
| 5,345,578 | 9/1994 | Manasse .................................. | 395/473 |
| 5,367,660 | 11/1994 | Gaf et al. .................................... | 711/3 |
| 5,428,761 | 6/1995 | Herlihy et al. ........................... | 711/130 |
| 5,434,992 | 7/1995 | Mattson .................................... | 395/446 |
| 5,535,116 | 7/1996 | Gupta et al. ............................. | 364/134 |
| 5,603,005 | 2/1997 | Bauman et al. ......................... | 395/451 |
| 5,604,882 | 2/1997 | Hoover et al. ........................... | 395/448 |

*Primary Examiner*—Tod R. Swann
*Assistant Examiner*—Tuan V. Thai
*Attorney, Agent, or Firm*—Robert P. Tassinari; Douglas W. Cameron; Anne Vachon Dougherty

[57] ABSTRACT

A cache coherence protocol for a multiprocessor system. Each processor in the system has an associated cache capable of storing multiple word data lines. The system also includes a plurality of main memory modules, each having an associated distributed global directory storing directory information for lines stored in the associated main memory module. Each main memory module is connected to each processor by means of a multi-stage interconnection network. When a processor attempts to over-write an individual word in a line stored in its associated cache, a write request signal is sent to the appropriate global directory, and each other processor whose cache stores a copy of the line is notified of the request. When each other processor has responded with an acknowledgement, the first processor is allowed to proceed with the write.

16 Claims, 5 Drawing Sheets

10

CACHE COHERENCE PROTOCOL FOR REDUCING THE EFFECTS OF FALSE SHARING IN NON-BUS-BASED SHARED-MEMORY MULTIPROCESSORS

FIELD OF THE INVENTION

The invention relates to cache coherence protocols.

BACKGROUND OF THE INVENTION

Cache coherence protocols suffer from the false sharing problem caused by the fact that a cache line is typically larger than the data access granularity. The solution has been to reduce the cache line size, resulting in reduced spatial locality. Our proposed design can implement coherence on a line and sub-line basis. This reduces the effects of false sharing while maintaining the spatial locality associated with larger lines sizes.

The advent of parallel processing systems has resulted in the potential for increased performance over traditional uniprocessor systems. Main memory bandwidth has not been able to meet the demands made by increasingly faster processors in such systems. One method to alleviate the access gap resulting from this problem is to associate with the processor a small high-speed buffer known as a cache. This cache is typically an order of magnitude faster than primary memory and it usually matches the speed of the processor.

Shared memory multiprocessors are typically composed of a number of processors with associated local memory and/or private caches, global memory and an interconnection network between the processors and some or all of global memory. The interconnection network may be bus-based (single-bus) or non-bus-based (i.e., a multi-stage interconnection network). For single-bus multiprocessors, the bus is used by all system components. Therefore, when implementing a cache coherence protocol, the bus can be used as a broadcast and serialization medium for all coherence related activity. Coherence implementations are more complex for multiprocessors that do not use a single-bus as the interconnection network.

The introduction of multiple caches with possible multiple copies of memory lines in shared memory systems may result in data inconsistencies. Hardware, software, or hybrid protocols are used to enforce cache coherence. All of these protocols are implemented based on a certain granularity of access, the cache line. If a line is larger than the data access size (i.e., one word), then it is possible for cache lines to be shared by multiple processors; however, the actual data accessed by each processor is not shared. This is denoted false sharing. False sharing is a major cause of performance degradation in shared memory multiprocessors. In fact, SMP cache line sizes are typically smaller than uniprocessor cache lines to reduce the effects of false sharing. However, this results in the reduced locality of reference per cache line and therefore reduced overall cache performance.

SUMMARY OF THE INVENTION

The invention is a method for maintaining consistency of data stored in multiple locations in a multiple processor system, comprising: storing a multiple word line in a plurality of storage locations; sending a request to modify a word in the line at one of the storage locations from one processor in the system to a directory storing global state information about that line; sending a word invalidation signal from the directory to other storage locations storing copies of the line; after each of the storage locations storing copies of the line have acknowledged the request, invalidating the word in the copies of the line at each of the other storage locations, and modifying the word in the one storage location.

DETAILED DESCRIPTION OF THE INVENTION

Figure 1:
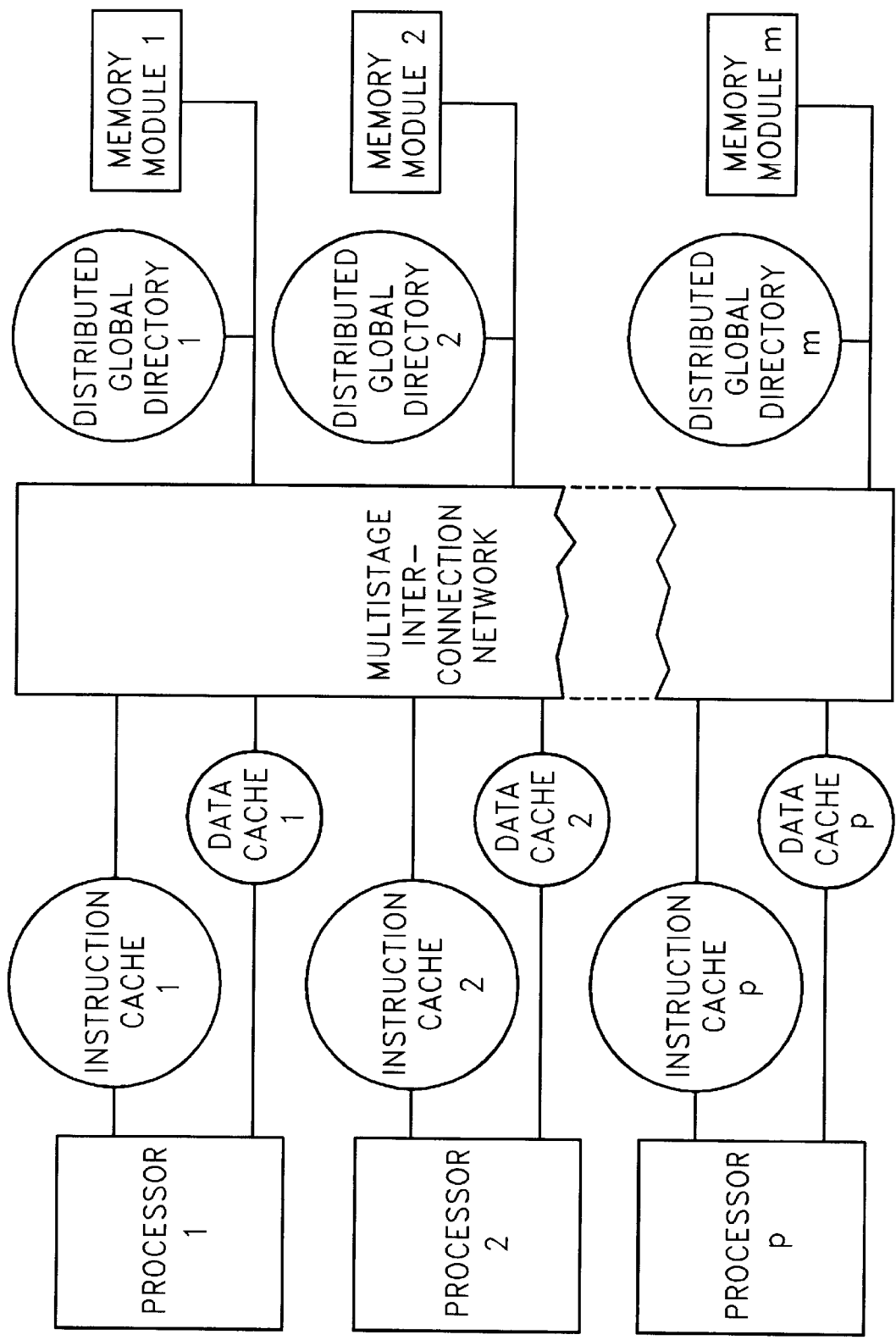
FIG. 1 is a multiprocessor system that can operate using the cache coherence protocol of the present invention.

Described is a protocol for use on cache sub-lines (for actual read-write sharing of data) and on cache lines (when there is no read-write sharing) in a directory-based cache coherence protocol. Also described is a system embodying this protocol. A shared memory multiprocessor system with private caches and an interconnection network that is not a shared bus (i.e., a multi-stage interconnection network (MIN)) is assumed. An example system is illustrated in FIG. 1. It includes a number of processors with associated private caches (the figure includes separate instruction and data caches; however, these two caches may be combined) and memory modules interconnected by a MIN. Associated with each memory module is a distributed global directory (DGD) used to maintain data coherence for the module. It is also assumed that in order to maintain cache coherence, state information is kept for each line and sub-line in the cache. A cache line is assumed to be some multiple of the sub-line size and to be composed of at least two sub-lines. Also, it is assumed that residence and modified bits are associated with each sub-line within a line. If a line has been allocated in the cache, then a residence bit is set for each sub-line that is present and valid. Likewise, a modified bit is set for each sub-line that has modified data.

Since the interconnection network assumed is not a single bus, each processor will not be able to directly monitor the activities of all other processors (as can be done by a snooping controller in single bus systems). As a result, it is assumed that a global directory is used and associated with each memory module in the system as shown in FIG. 1. This global directory contains the global line and global sub-line state for each line and sub-line entry. Also included in this directory is information identifying from one to n caches (n is the total number of processors in the system) with copies of the line. When a processor accesses data that is not in its associated cache or when it attempts to modify data with a read-only presence in its cache, a request is sent to the global directory. The access is not completed until a response is received from this directory.

Figure 2:
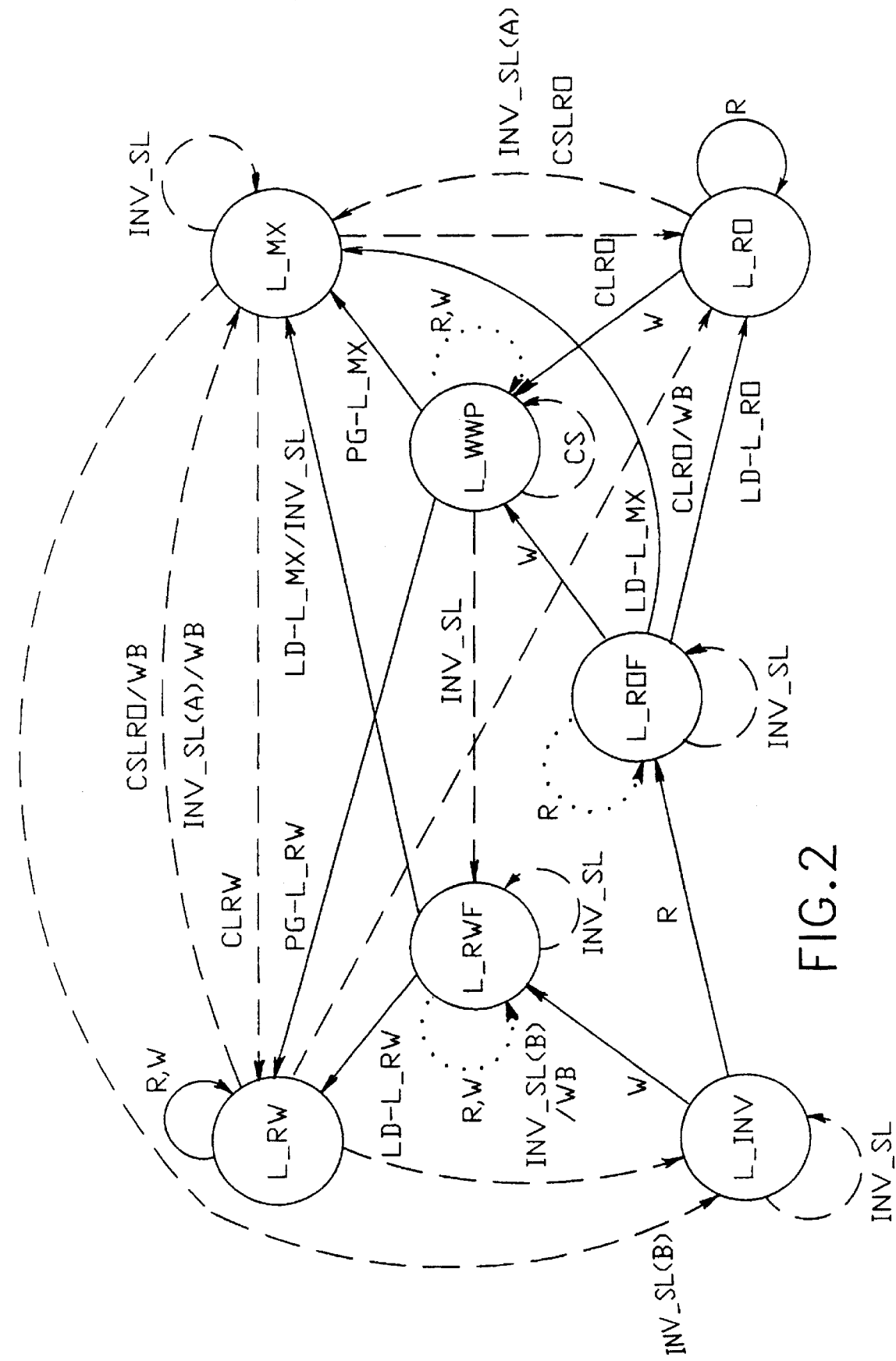
FIG. 2 is a state diagram showing the handling of cache lines in accordance with the protocol of the invention.

A cache line may be in one of three transient states or in one of four non-transient states as shown in FIG. 2. A transient state indicates the initial step taken to change to a permanent (non-transient) state; however, the cache is awaiting a signal from the global directory before making the transition. The transient states are needed in non-bus-based systems to eliminate possible race conditions which may occur as a result of the handshaking required between the cache and the global directory to complete an access. Outlined below are the three transient states of a cache line:

$L_{13}$ ROF: Line read-only filling. A read request has been sent to the global directory for a line that was either not present or invalid in the cache. The cache is currently awaiting the directory's response.

L_RWF: Line read/write filling. A write request has been sent to the global directory for a line that was either not present or invalid in the cache. The cache is currently awaiting the directory's response.

$L_{13}$ WWP: Line waiting for write permission. A write request has been sent to the global directory for a line with a read-only presence in the cache. The cache is currently awaiting the directory's reply with a permission granted signal.

Outlined below are the four non-transient states of a cache line:

L_INV: Line invalid state. The line has been invalidated.

L_RO: Line read-only state. One or more read-only copies of the line exists in private caches.

L_RW: Line exclusive read/write state. One modified copy of the line exists in a private cache and at least one sub-line has been modified.

$L_{13}$ MX: Line mixed state. At least two caches have copies of the line (although not all sub-lines may be valid). Also, for all copies of the line in the various caches, there are at least two valid sub-lines in this line state. These two sub-lines are present in different caches and at least one of these sub-lines has to be in the SL_RW sub-line state (see below). Cache coherence is enforced at the sub-line granularity level in this state. (In all other line states, coherence is enforced at the line granularity level).

Figure 3:
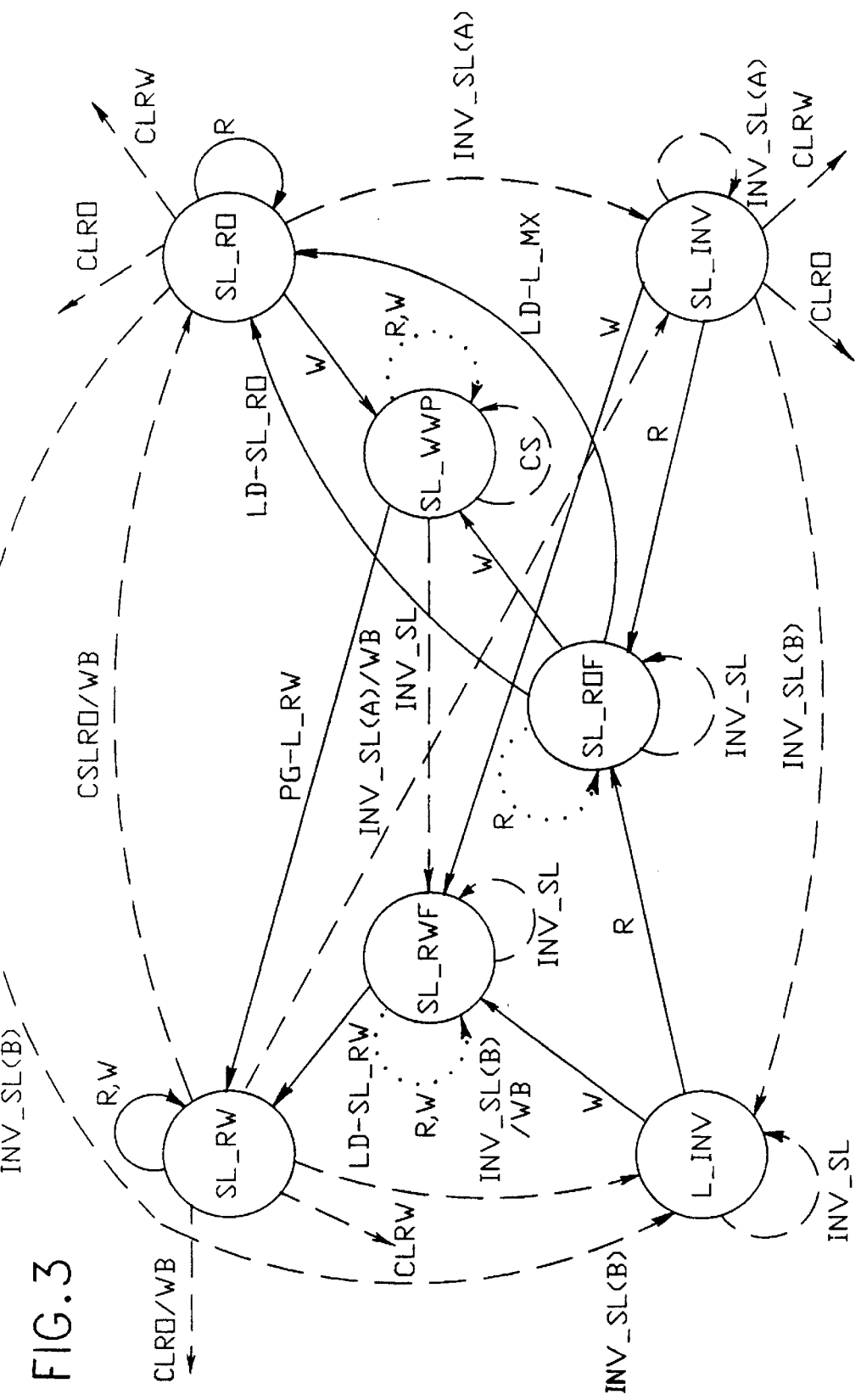
FIG. 3 is a state diagram showing the handling of cache sub-lines in accordance with the protocol of the invention.

A sub-line may be in one of three transient states or one of three non-transient states as shown in FIG. 3. Outlined below are the three transient states:

SL_ROF: Sub-line read-only filling state. A read request has been sent to the global directory for a line in the L_MX state, but with this particular sub-line in the SL_INV state. The cache is awaiting a response from the directory.

SL_RWF: Sub-line read/write filling. A write request has been sent to the global directory for a line in the L_MX state with the referenced sub-line in the SL_INV state. The cache is awaiting a response from the directory.

SL_WWP: Sub-line waiting for write permission. A write request has been sent to the global directory for a line in the L_MX state with the referenced sub-line in the SL_RO state. The cache is awaiting a response from the directory.

Outlined below are the three non-transient states of a sub-line:

SL_INV: Sub-line invalid state. The sub-line has been invalidated.

SL_RO: Sub-line read-only state. One or more read-only copies of the sub-line exists in private caches.

SL_RW: Sub-line exclusive read/write state. One modified copy of the sub-line exists in a private cache.

In this coherence protocol there are several signals that can be received and processed by the cache. These signals are outlined below:

Read (R): Issued by the processor to the global directory to request data.

Write (W): Issued by the processor to the global directory to modify data.

INV_SL: Invalidate sub-line. Issued by the global directory to the private caches as a result of implementing the coherence protocol. An INV_SL signal is sent to remote sub-lines when a processor attempts to modify a sub-line.

CLRO: change state to L_RO. Issued by the global directory to a cache under three conditions. First, if a line is in the L_RW state in a cache and another processor wants to read the line, then a CLRO signal is sent to the cache with the exclusive copy. Second, if a line is in the L_MX state with only one sub-line in the SL_RW state and a cache issues a read request for that sub-line, then a CLRO signal is sent to all caches with L_MX copies of the line. Third, if a line is in the L_MX state with only one sub-line in the SL_RW state and that line is replaced, then a CLRO signal is sent to all other caches with L_MX copies of the line.

CSLRO: change state to SL_RO. Issued by the global directory to a cache as a result of a read to a sub-line in the SL_RW state if the sub-line is not the only sub-line within the line in this state.

CLRW: change state to L_RW. Issued by the global directory to a cache as a result of a line replacement signal it has received from another private cache that results in one modified copy of the line.

LR: line replaced. The line has been replaced in the cache. This signal is sent from the processor to the global directory.

PG-L_MX: permission to modify granted. Change the line state to L_MX and the sub-line state to SL_RW. This signal is sent from the global directory to the cache in response to a modify request.

PG-L_RW: permission to modify granted. Change the line state to L_RW. This signal is sent from the global directory to the cache in response to a modify request.

LD-L_RW: change the line state to L_RW. The line is also loaded into the cache. This signal is sent from the global directory to the cache in response to a write request.

LD-L_RO: change the line state to L_RO. The line data is also loaded into the cache to be read. This signal is sent from the global directory to the cache in response to a read request.

LD-L_MX: change the line state to L_MX and the sub-line state to SL_RO. The sub-line data is loaded into the cache to be read. This signal is sent from the global directory to the cache in response to a read request. LD-SL_RW: change the sub-line state to SL_RW. The sub-line data is also loaded into the cache to be read. This signal is sent from the global directory to the cache in response to a write request.

LD-SL_RO: change the sub-line state to SL_RO. The sub-line data is loaded into the cache to be read. This signal is sent from the global directory to the cache in response to a read request.

FIG. 2 is a state diagram for a line in private cache i. The terminology in this figure is such that the leftmost character (s) indicate the type of signal received by the private cache. The character in parenthesis indicates the type of condition present when the signal is received. The characters to the right of the slash indicate the coherence action taken as a result of processing the signal. Signals received by private cache i from its associated processor are indicated by the solid lines and those not received from the processor are indicated by the dashed lines. This protocol can be used for caches that are lockup free and those that are not. If the cache is lockup free, then the dotted lines represent the processor requests issued while the line is in a transient state. If the cache is not lockup free, then the cache will only process requests from the processor when a previous request has been completed. Therefore, no processor requests are processed while a line is in a transient state in this case.

If a line is in the L_RW state, the coherence protocol is implemented on the entire line, however, the modified bits are associated with sub-lines and are therefore set on a sub-line basis. Therefore, when a write-back is required, the entire line is not written back; only the modified sub-line(s).

Outlined below are the actions taken as a result of a processor read or write or of some external signal processed by the cache when in each of the line states described above:

L_INV:
  Read: If the processor issues a read, the state of the line will change to L_ROF and a read request is sent to the global directory.
  Write: If processor i issues a write, the state of the line will change to L_RWF and a write request is sent to the global directory for the line.
  INV_SL: If a INV_SL signal is received, then the line remains in the L_INV state.

L_RO
  Read: The line remains in the L_RO state after processor i issues a read.
  Write: The state of the line is changed to L_WWP and a request is sent to the global directory to modify the line. (This means that from one to all sub-lines within the line may be modified. Information on the actual number of sub-lines to be modified are assumed to be sent along with the modify request).
  INV_SL: If an invalidate sub-line signal is sent to sub-line p then the state of the line is changed to L_MX, the sub-line state is set to SL_INV, and the appropriate residence bit is reset.
  CSLRO: Change the state of the line to L_MX and the state of the sub-line to SL_RO.

L_RW:
  Read: A processor read will not change the state of the cache line. No coherence action is necessary.
  Write: A processor write will not change the state of the cache line. No coherence action is necessary.
  INV_SL: If an invalidate sub-line signal is received for sub-line p, then the line state is changed to L_MX and the residence bit for sub-line p is reset. Also, the sub-line state is set to SL_INV and the modified sub-line is written-back to memory and the requesting processor (the processor that initiated a write that resulted in the INV_SL signal).
  CLRO: Change the state of the line to L_RO. All modified sub-lines within the line are then written back to memory and the requesting processor and the appropriate modified bits are reset.
  CSLRO: Change the state of the line to L_MX (and change the state of the sub-line to SL_RO). If the sub-line has been modified, then it is written back to memory and processor i and the appropriate modify bit is reset.

L_MX:
  INV_SL: The state is changed to L_INV when receiving this signal for sub-line p, if there are no other valid copies of sub-lines q (q not equal p) within the line, as determined by the global directory. Also, all residence bits are set. If there are other valid sub-lines within the line, then the line remains in the L_MX state and the residence bit for sub-line is reset.
  CLRO: The state is changed to L_RO upon receiving this signal. All sub-lines that are not present in the cache will also be sent along with the CLRO signal.
  CLRW: The state is changed to L_RW upon receiving this signal. All sub-lines that are not present in the cache will also be sent along with the CLRW signal.

L_ROF:
  Read: A processor read will not change the state of the cache line. No coherence action is necessary.
  Write: A processor write will result in a state change to L_WWP and a modify signal is sent to the global directory.
  INV_SL: The receipt of an invalidation sub-line signal will not change the state of the cache line. No coherence action is necessary.
  LD-L_RO: Change the state of the line to L_RO and receive the line data into the cache. Set the appropriate residence bits.
  LD-L_MX: Change the state of the line to L_MX and the sub-line state to SL_RO. Receive the sub-line data into the cache and set the appropriate residence bits.

L_RWF:
  Read. A processor read will not change the state of the cache line. No coherence action is necessary.
  Write: A processor write will not change the state of the cache line. No coherence action is necessary.
  INV_SL: An invalidate sub-line signal will not change the state of the cache line. No coherence action is necessary. $_{LD-L}$_RW: Change the state of the line to L_RW and receive the line data into the cache.
  LD-L_MX: Change the state of the line to L_MX and the sub-line state to SL_RW. Receive the sub-line data into the cache and set the appropriate residence bit.

L_WWP:
  Read: A processor read will not change the state of the cache line. No coherence action is necessary.
  Write: A processor write will not change the state of the cache line. No coherence action is necessary.
  INV_SL: Change the state of the line to L_RWF.
  PG-L_RW: Change the state of the line to L_RW and update the appropriate modified and residence bits.
  PG-L_MX: Change the state of the line to L_MX and the sub-line state to SL_RW. Update the appropriate modified and residence bits.

Presented in FIG. 3 is the state diagram for sub-lines. In most cases, when the state of a line is changed from the L_MX state to another line state, it is changed to the L_INV state. However, the state of the line can be changed to the L_RO and L_RW states upon receiving the CLRO and CLRW signals, respectively. The L_INV state is therefore included in the sub-line state diagram (even though it is not a sub-line state) for completeness. The coherence protocol for the sub-line state is very similar to that for the line state. The state of a sub-line is changed from SL_INV to L_INV if the line has been selected for replacement or if the cache has received an INV_SL signal from the global directory and there are no other valid sub-lines with the cached line (as determined by the directory). Otherwise, the state remains SL_INV. The state is changed from SL_INV to SL_ROF if there is a read to the sub-line. The state is changed from SL_INV to SL_RWF if there is a write to the sub-line. Also, the line state is changed to L_RO or L_RW upon receiving the CLRO or CLRW signals from the global directory, respectively. In both of these cases, sub-line data is also transferred to the caches that do not have the sub-lines present.

The state of the sub-line is changed from SL_RO to SL_WWP if there is a write to the sub-line. In addition, an invalidate sub-line (INV_SL) signal is sent by the directory to other caches. The state of the sub-line is changed from SL_RO to SL_INV if an INV_SL signal is received from the directory and there are other valid sub-lines within the cached line. Otherwise, the state is changed to L_INV. The state of the line is changed to L_RO or L_RW upon receipt of the CLRO or CLRW signals, respectively, from the global directory. Sub-line data is also transferred to the cache for all sub-lines not resident in the cache. The state of the sub-line is changed from SL_RW to SL_RO if a CSLRO (change state to SL_RO) signal is received from the global directory. The state of the sub-line is changed from SL_RW to SL_INV if an INV_SL signal is received and there are other valid sub-lines within the cached line. The state of the sub-line is changed from SL_RW to L_INV if an INV_SL has been received and there are no other valid sub-lines within the cached line. The state of the sub-line is changed from SL_RW to L_RO or L_RW if a CLRO or CLRW signal is received, respectively. The sub-line data is also transferred to the cache for all sub-lines not resident.

The state of the sub-line is changed from SL_ROF to SL_RO upon receiving the LD-L_MX or LD-SL_RO signal from the directory. The state of the sub-line is changed from SL_ROF to SL_WWP as a result of a processor write request. A modify signal is also sent to the global directory. The state of the sub-line is changed from SL_RWF to SL_RW as a result of receiving the LD-SL_RW signal from the global directory. The state of the sub-line is changed from SL_WWP to SL_RW as a result of receiving the PG-L_RW signal. The sub-line state is changed from SL_WWP to SL_RWF upon receiving the INV_SL signal from the directory. The sub-line state is unchanged upon receipt of the CSLRO or CLRO signals.

We assume that the entire line is to be transferred to the cache or is present in the cache if the state of the line is L_RO or L_RW. If the line is in the L_MX state, then the transfer size granularity is the sub-line.

Figure 4:
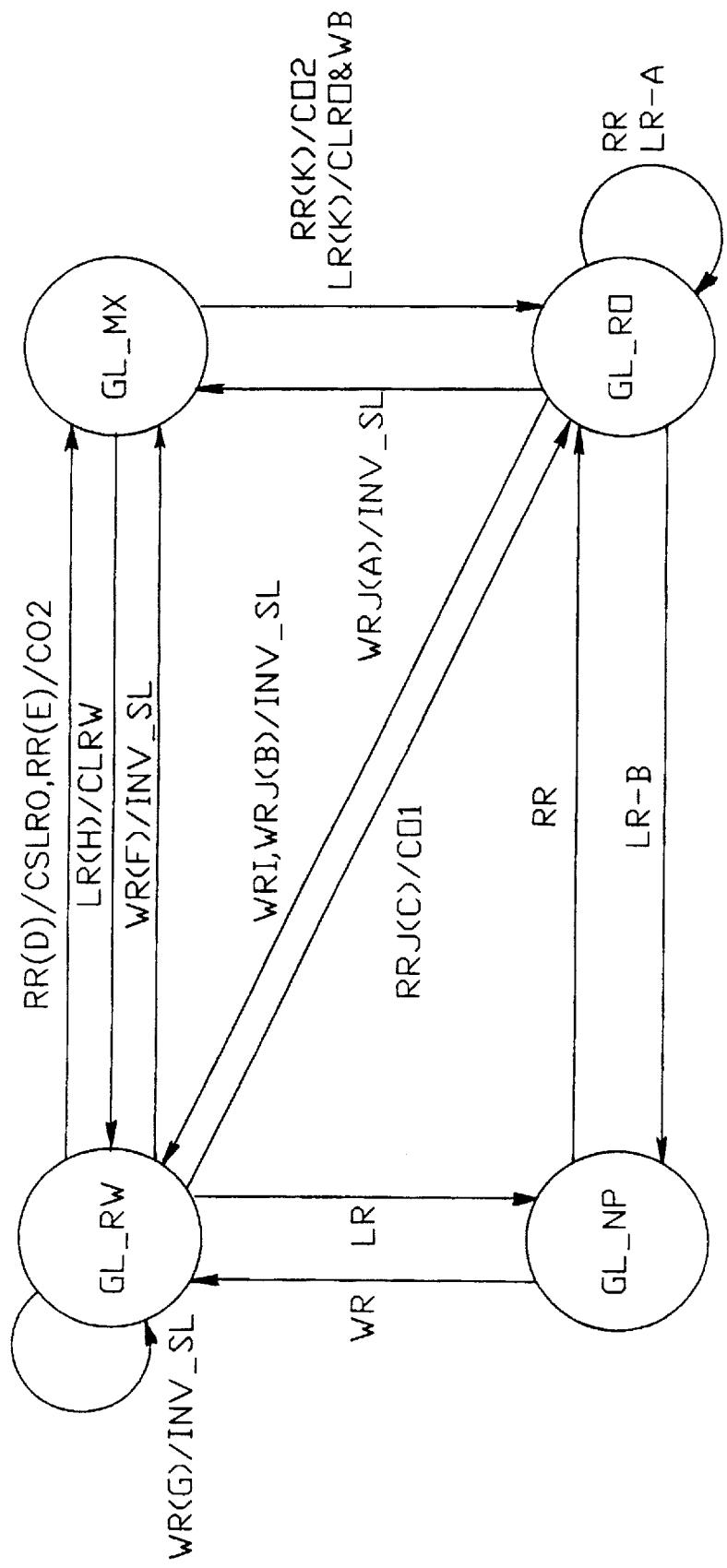
FIG. 4 is a state diagram describing actions taken by the global directory in accordance with the invention.
Figure 5:
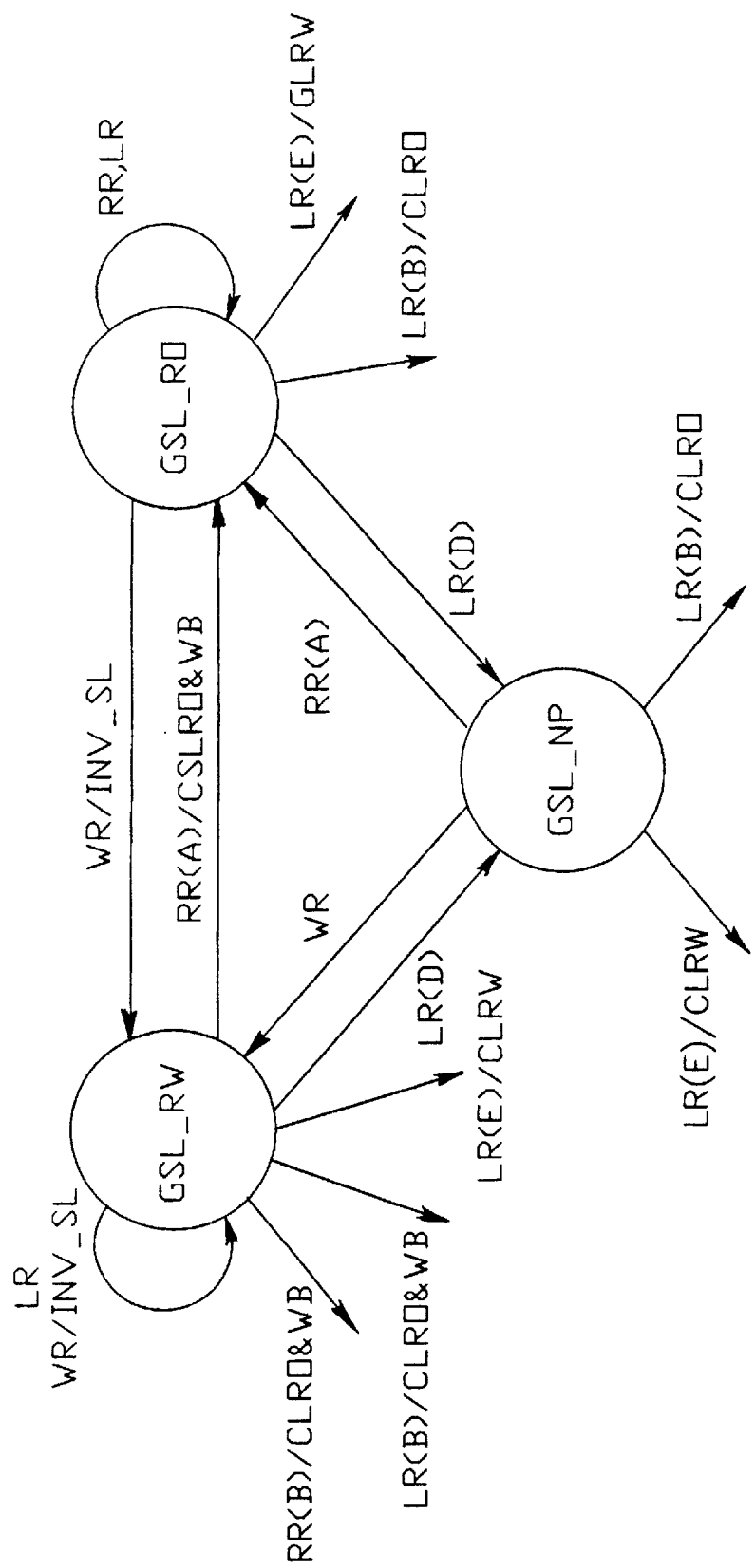
FIG. 5 is a state diagram for global directory sub-line entry.

Referring to FIG. 4, the actions taken by the global directory are now described (as a result of receiving coherence requests from the private caches) when the line is in one of the following global states:

GL NP—the line is not present in any cache:
  Read: The global state of the line is changed to GL_RO. Also, the appropriate cache identification information is updated.
  Write: The global state of the line is changed to GL_RW and the appropriate cache identification information is updated.

GL_RO:
  Read. A read from any cache will not change the global state of this line.
  Write. The global state of the line is changed to GL_RW if the requesting cache has an exclusive copy of the line. If more than one cache has a copy of the line, then the global line state is changed to GL_MX, the appropriate sub-line state is set to GSL_RW, the sub-line state for all other sub-lines present in the caches is set to GSL_RO (the directory sends CSLRO signals to these caches), and the appropriate cache identifiers for the sub-lines are updated.
  LR. If a line replaced signal has been received and only one cache has a copy of the line, then the global line state is changed to GL_NP. Otherwise, the global state remains unchanged and the appropriate cache identifier information is updated.

GL_RW:
  Read: A read from a cache that does not have an exclusive copy of the line will result in a global state change to GL_RO or GL_MX. The global state is changed to GL_RO if the sub-line accessed is the only modified sub-line in the line. In this case a CLRO signal is sent to the cache with the exclusive copy of the line and the modified sub-line is then written-back to main memory. Afterwards, the entire line is transferred to the requesting cache. The global state is changed to GL_MX if other sub-lines within the line are dirty. A CSLRO signal for the accessed sub-line is sent to the cache with the exclusive copy of the line. (This will result in a line state change for this exclusive copy to L_MX and in the change of state for the other sub-lines in the line to SL_RO or SL_RW, depending upon whether or not they are modified). If the accessed sub-line is also dirty, then it is written back to memory. The sub-line is then transferred to the requesting cache. This cache sets the line state to L_MX and the sub-line state to SL_RO. The global sub-line state is set to GSL_RO and the appropriate cache identifiers for the sub-line are updated in the directory.
  Write: A write from a cache that does not have an exclusive copy of the line will result in a global state change to GL_MX if there are valid sub-lines other than the one accessed by the write. In this case, an INV_SL signal is sent to the cache with the exclusive copy of the line. Also, the global sub-line state is set to GSL_RW. If there are no other valid sub-lines within the line, then the global line state remains GL_RW, an INV_SL signal is sent to the cache with the exclusive copy and this cache writes back the modified data, and the appropriate cache identifier information is updated in the directory.
  LR: If a line replaced signal is received, then the global line state is changed to GL_NP. Also, the modified sub-lines are written back to memory.

GL_MX:
The global line state can be changed to GL_RW or GL_RO while in this state. See the discussion on the global sub-line protocol for details.

Global actions to a sub-line occur only when the global state of the line is GL_MX. Outlined below are the sub-line actions taken by the global directory (as a result of receiving coherence requests) when the global sub-line state is as follows:

GSL NP—the sub-line is not present in any cache:
  Read: The global sub-line state is changed to GSL_RO. The appropriate sub-line cache identifier information is updated in the directory.
  Write: The global sub-line state is changed to GSL_RW and the appropriate sub-line cache identifier information is updated in the directory.
  LR: If a line has been replaced, leaving only one copy of the line in a cache, the global line state is changed to GL_RW if the remaining line has at least one sub-line in the GSL_RW state. Otherwise, the global line state is changed to GL_RO. In either case, the appropriate cache identifier information is updated for the line.

GSL_RO:

Read: If a read request is received, then the global sub-line state does not change; however, the appropriate cache identifier information is updated in the directory.

Write: A write request will result in a sub-line state change to GSL_RW and in INV_SL signals sent to the appropriate caches. Also, the cache identifier information is updated in the directory.

LR: If a line replaced signal is received, leaving only one cache with a copy of the line, then the global line state is changed to GL_RW if the line has at least one sub-line in the GSL_RW state. Otherwise, the global line state is changed to GL_RO. The directory sends a CLRW or CLRO signal, respectively, to inform the cache to change the local state of the line. If the particular replaced line results in no valid copies of the sub-line in any cache, but there is still at least one valid sub-line within the line in the GSL_RW state and one valid sub-line in the GSL_RO state (and these sub-lines are present in different caches), then the global state of the sub-line is changed to GSL_NP. For all cases not described here, the global sub-line state is unchanged and the appropriate cache identifier information is updated in the directory.

GSL_RW

Read: If a read request is received for this sub-line and there are other sub-lines within the line in the GSL_RW state, then the global sub-line state is changed to GSL_RO and a CSLRO signal is sent from the directory to the appropriate cache. Otherwise, the global line state is changed to GL_RO and a CLRO signal is sent to the appropriate cache. In both cases, the cache will write-back the modified data to memory and all sub-lines that compose the line and are not resident in the caches involved are transferred to these caches.

Write: A write request will not result in a global state change; however, an INV_SL signal is sent to the appropriate cache and the cache identifier information is updated in the directory.

LR: A line replaced signal will result in a global line state change to GL_RO if only one cache now has a copy of the line and that copy has no modified sub-lines. (This means that the replaced line had the only modified sub-line so this data is written back to memory when the line replaced signal is sent). The global line state changes to GL_RW if only one cache now has a copy and there is at least one modified sub-line. The global sub-line state is changed to GSL_NP if there are no valid copies of the sub-line in any cache; however, at least one sub-line within the line is in the GSL_RW state and one sub-line in the GSL_RO state (and these sub-lines are in different caches). If a line replaced signal is received in any other instance, then the global sub-line state is unchanged and the appropriate cache identifier information is updated in the directory.

This invention can be used in any data coherence protocol that does not allow the multiple components involved to view the coherence activity concurrently. For example, a shared memory multiprocessor with a multistage interconnection network that implements a cache coherence protocol can use this invention. This invention is not limited to hardware implementations. Any data coherence protocol (software, hardware, hybrid, or other) that does not provide a means for the multiple components to view the coherence activity concurrently can use this invention to reduce the effects of false sharing.

This disclosure describes an invention that reduces the effects of false sharing in data coherence protocols. This facilitates the use of line sizes that are larger than the typical line size without this invention. This results in better spatial locality within the line. If data is actually falsely shared, then the granularity of sharing is at the sub-line line level. The false sharing is therefore reduced considerably. This overall reduction increases as the number of sub-lines increase. Therefore, overhead system performance is improved because the effects of false sharing are reduced and the cache spatial locality is improved.

We claim:

1. A method for maintaining consistency of data stored in multiple locations in a multiple processor system, comprising:
   storing sub-lines of a multiple-word-line in a plurality of storage locations, each sub-line comprising at least one word from said multiple-word-line;
   sending a request to modify information in a sub-line of the multiple-word-line at one of the storage locations from one processor in the system to a directory storing global state information about that line;
   said directory changing the state of said line to a mixed state;
   sending an invalidation signal from the directory to other storage locations storing copies of said sub-line of the line;
   generating an invalidation acknowledgement at each of the other storage locations storing copies of said sub-line of the line after each has invalidated the information in the sub-line of multiple-word-line; and modifying the information in said sub-line of the multiple-word-line in the one storage location in response to the invalidation acknowledgement wherein the remaining sub-lines of the multiple-word-line in the other storage locations remain valid.

2. The method of claim 1, wherein the request is acknowledged by the storage locations by sending acknowledgement signals to the requesting processor.

3. The method of claim 1, wherein the request is acknowledged by the storage locations by sending acknowledgement signals to the directory storing the global state information.

4. A cache coherence protocol in a multiprocessor system wherein each processor has an associated data storage location, the system further comprising a main memory, comprising:
   reading by one processor a multi-word line of data from the main memory, sub-lines of said multi-word line having previously been stored in more than one data storage location associated with one or more processors, wherein each of said sub-lines comprises at least one word of said multiple-word-line;
   writing the line of data to the data storage location associated with the one processor;
   when the one processor wishes to write information in said sub-line of the multi-word line, sending a write-request to a directory storing global state information for the line; said directory changing the state of said line to a mixed state;
   directing each of the one or more other processors to invalidate the information in the sub-line of the multi-word line at their associated data storage locations, wherein the remaining sub-lines of the multiple-word-line in the other storage locations remain valid; and
   generating, at each of the one or more data storage locations, an invalidation acknowledgement signal.

5. The protocol of claim 4, wherein each data storage location that acknowledges the invalidation invalidates the information to be written; and wherein the remaining sub-lines of the multi-word line remain valid.

6. The protocol of claim 4, wherein each data storage location is a cache memory.

7. A system, comprising:

a plurality of processors;

a plurality of cache memories, each coupled to and associated with a different one of the processors, each cache memory including means for storing a sub-line of a multi-word line of data;

a plurality of memory modules;

a plurality of global directories each coupled to one or more of the memory modules;

a multi-stage interconnection network including means for coupling each memory module and global directory to each processor; and means, responsive to a request by one of the processors to over-write a information in one of said sub-lines of a multi-word line in its associated cache memory, for invalidating the information to be overwritten in each of the other cache memories storing copies of the information to be overwritten, said means for invalidating comprising:

means for sending a modification request to one of the global directories storing the global director information for the line that includes the information to be overwritten:

mean for sending modification notification to each other processor associated with a cache memory storing a sub-line of the line containing the information to be overwritten; and means in each of the other processors for responding to the modification notification with an invalidation acknowledgement.

8. The system of claim 7, wherein each invalidation acknowledgement is sent directly to the requesting processor.

9. The system of claim 7, wherein word invalidation acknowledgement is sent to the one global directory.

10. The system of claim 9, wherein the one global directory includes means, responsive to receiving all invalidation acknowledgements for a requested over-write, for sending a write authorization signal to the requesting processor.

11. The system of claim 7, wherein the one global directory is associated with a memory module storing the sub-line containing the information to be overwritten.

12. The system of claim 7, wherein each cache memory includes an instruction and data cache.

13. The system of claim 7, wherein each global directory stores for each line it services: global line and word state information, and an identification of each cache in which a sub-line of the line is stored.

14. The system of claim 7, further comprising means for maintaining the validity of the remaining sub-lines in the multi-word line in each of the other cache memories.

15. The system of claim 7, wherein each cache memory is a combined instruction and data cache.

16. The system of claim 7, wherein each global directory is a distributed global directory coupled to and associated with a different one of the memory modules.

* * * * *